3,085,989
PROCESS FOR INCORPORATING A POLYMER-COATED ACIDIC PIGMENT IN POLYETHYLENE

Merrill E. Jordan, Walpole, Mass., assignor to Cabot Corporation, Boston, Mass., a corporation of Delaware
No Drawing. Filed Feb. 20, 1958, Ser. No. 716,266
9 Claims. (Cl. 260—41)

This invention relates generally to plastic compositions and has particular reference to highly pigmented polymer compositions of the type which are adapted to be heat treated to improve the physical characteristics thereof.

It has been found that polymers composed of essentially saturated long chain high molecular weight compounds of carbon and hydrogen, such as are formed by the polymerization of olefins such as ethylene, can be greatly improved, in creep resistance and stress cracking properties, by the addition thereto of a free radical producing agent which, on subsequent heat treatment of the polymer, decomposes to effect cross linking between adjacent polymer chains. In the compounding of these polymers it has also been found that the yield strength can be greatly improved by the incorporation therein of certain types of pigments, particularly carbon black. For example, the addition of 100 parts by weight of carbon black for each 100 parts by weight of polyethylene can increase the yield strength from about 1700 p.s.i. to as high as 3000 p.s.i. when the compound is properly cross linked.

For many applications, notably where color is important, it is desirable to incorporate into the polymer a pigment other than carbon black, for example, clay or finely-divided silica. However, these pigments do not provide improvement in physical properties approaching that of carbon black due to the acidic nature of their surfaces which interferes with the action of the cross-linking agent.

An object of this invention is to provide a heat-curable, organic peroxide-containing polymer composition containing a normally cure-inhibiting acidic pigment.

A further object of the invention is to provide a pigment for such composition having a coating which will not soften at the fluxing temperature of the main polymer and hence which will not dissolve or strip off during milling of the pigment into the polymer.

A further object of the invention is to provide a method of producing such composition.

Other objects of the invention will be obvious to one skilled in the art from the following description of a specific embodiment thereof.

In accordance with this invention, I have discovered that acidic pigments such as clay and finely-divided silica can satisfactorily be used as fully reinforcing fillers in peroxide-curable polymeric systems if the pigment is first coated with a material which is compatible with the polymer, in such manner that the coating will not dissolve or be stripped off from the pigment during incorporation into the polymer. The coating must, therefore, be a material which is insoluble in the polymer into which it is being incorporated at the usual milling temperature of the polymer and will preferably be a polymer of the same or related composition having a higher softening temperature than that of the main polymer.

For example, if the pigment is to be milled into low density polyethylene the coating polymer may be either high density polyethylene or cross-linked low density polyethylene. On the other hand, if the pigment is to be milled into high density polyethylene, the coating may be either polyethylene which has been cross linked or a higher melting polymer such as nylon or Teflon, a tetrafluoroethylene polymer, produced by E. I. du Pont de Nemours & Co.

To prepare a pigment such as clay or finely-divided silica for incorporation into low density polyethylene, the pigment typically is first dispersed into polyethylene of the high density type by fluxing on a roll mill or in a Banbury mixer, with an extremely high ratio of pigment to polyethylene. The compound so formed may then be cooled and ground by any convenient means into a fine powder. This powder is then used as a pigment for incorporation into the low density polyethylene. Since the milling temperature of the low density type of polyethylene is considerably below the fluxing temperature of the high density type, the coating on the pigment will not be stripped off during the milling process.

As an example of the above method of preparing coated pigments, 100 parts by weight of a polyethylene of the high density type, having a density of 0.955 is fluxed in a Banbury mixer with 500 parts by weight of kaolinite clay. A temperature of about 250° F. is required to accomplish the fluxing. After the mixture is thoroughly dispersed, it is allowed to cool and is then chopped into a fine powder preferably to a particle size of −200 mesh. This powder is then used as a pigment in compounding low density polyethylene with a cross-linking agent, by fluxing 100 parts by weight of low density polyethylene having a density of about 0.90 with 100 parts by weight of the coated pigment and 2 parts by weight of a cross-linking agent such as dicumyl peroxide. This compound may be fluxed at a temperature of 215° F.; hence, the coating of high density polyethylene on the pigment will not be stripped off of the pigment during the milling process. The acidic pigment, being insulated by the coating from the cross-linking agent, will not interfere with the action of a cross-linking agent on subsequent heat treatment of the compounded material.

To prepare a pigment of this type for incorporation into high density polyethylene, the pigment may be milled with a small proportion of low density polyethylene with a suitable cross-linking agent, allowed to cool, and then chopped into a powder. The powder may thereafter be subjected to heat treatment in any convenient manner to effect cross linking of the polymer coating on the surface of the pigment. Although the presence of the acidic pigment inhibits chemical cross-linking action to a large extent, there will still be sufficient chemical cross-linking to bond the polymer to the pigment and thus prevent its being stripped off when the pigment is milled into high density polyethylene. In some cases it may be desirable to effect cross linking of the pigment coating by means of high energy irradiation as disclosed in British Patents 740,899 and 747,478 to Charlesby.

In a specific example of the above method of preparing a pigment for incorporation into high density polyethylene, 100 parts by weight of a polyethylene of the low density type is fluxed in a Banbury with 500 parts by weight of kaolinite clay, with 3 parts by weight of dicumyl peroxide. After the mixture is thoroughly dispersed, it is allowed to cool and then is chopped into a fine powder. The powder is then heated at a temperature of 350° F. for 15 minutes to effect cross linking of the polymer. The material is then suitable for use as a pigment in compounding high density polyethylene with a cross-linking agent as previously described.

In effecting cross linking of the coating, cross-linking agents other than dicumyl peroxide may be used, for example, tertiary butyl perbenzoate. Although this latter compound is not as effective in promoting cross linking as dicumyl peroxide, its action is not inhibited by the acidic pigment, and the amount of cross linking obtained is sufficient for the purpose of raising the softening temperature of the coating.

Although the above described methods are particularly adapted for incorporating clay and finely-divided silica pigments into polymers to be cross linked, it is also adaptable to coating carbon black pigments for this purpose. In particular, channel black, which has an acidic surface, may be coated by the above methods in preparation for incorporation into a polymer to be cross linked.

Although in the above specific example, dicumyl peroxide was used as the cross-linking agent, many other cross-linking agents have been used or proposed for use in compounding heat treatable polymers, and such agents may be incorporated into filler polymers by the teachings of this invention.

Examples of such agents are organic peroxides, organic disulfides, and azo compounds.

Since certain obvious changes may be made in the invention without departing from the scope thereof, it is intended that all matter therein be interpreted in an illustrative and not in a limiting sense.

I claim:

1. The method of dispersing a finely divided, acidic pigment body into polyethylene, which is to be heat treated to effect the decomposition of an organic peroxide contained therein and thereby effect crosslinking, which action is normally inhibited by the presence of said acidic pigment body, which comprises milling said finely divided acidic pigment body with a polymeric material which does not soften at the minimum fluxing temperature of said polyethylene, forming the milled mixture into granules of less than 200 mesh in size, and milling said granules into said polyethylene.

2. The method of claim 1 wherein said acidic pigment body is chosen from the group consisting of carbon black, silica and kaolinite clay.

3. The method of claim 1 in which said polyethylene is low density polyethylene and said polymeric material is high density polyethylene.

4. The method of dispersing a finely divided, acidic pigment body into polyethylene which is to be heat treated to effect the decomposition of an organic peroxide contained therein and thereby effect crosslinking, which action is normally inhibited by the presence of said acidic pigment body, which comprises milling said finely divided, acidic pigment body with a polymeric material chosen from the group consisting of low density polyethylene and high density polyethylene, crosslinking the resulting mixture, forming the mixture into granules of less than 200 mesh size, and milling said granules into said first mentioned polyethylene.

5. The method of dispersing a finely divided, acidic pigment body into polyethylene which is to be heat-treated to effect the decomposition of an organic peroxide contained therein and thereby effect crosslinking, which action is normally inhibited by the presence of said acidic pigment body, which comprises milling said finely divided, acidic pigment body with a polymeric material chosen from the group consisting of low density polyethylene and high density polyethylene, forming the mixture into granules of less than 200 mesh size, crosslinking the polymeric surface of the resulting granules, and then milling said granules into said first mentioned polyethylene.

6. A heat-curable filled, polymeric composition comprising as the chief base polymer uncrosslinked polyethylene, as the chief curing agent an organic peroxide, and as the chief filler a particulate, composite pigment having a particle size of less than 200 mesh, said composite pigment particles being composed of an acidic core coated with a polymeric material which does not soften at the fluxing temperature of the base polymer.

7. The composition of claim 6 in which said polymeric material is a cross-linked polymeric material.

8. The composition of claim 6 wherein said polyethylene is low density polyethylene and said polymeric material is high density polyethylene.

9. The composition of claim 6 wherein said polyethylene is high density polyethylene and said polymeric material is cross-linked polyethylene.

References Cited in the file of this patent

UNITED STATES PATENTS

| | | |
|---|---|---|
| 2,472,680 | Pratt | June 7, 1949 |
| 2,628,214 | Pinkney et al. | Feb. 10, 1953 |
| 2,710,291 | Little | June 7, 1955 |
| 2,749,248 | Benson | June 5, 1956 |
| 2,793,195 | Vesce | May 21, 1957 |
| 2,876,133 | Iler et al. | Mar. 3, 1959 |
| 2,888,424 | Precopio et al. | May 26, 1959 |

FOREIGN PATENTS

| | | |
|---|---|---|
| 591,058 | Great Britain | Aug. 6, 1947 |